United States Patent [19]

Boissonnat et al.

[11] Patent Number: 5,571,326
[45] Date of Patent: Nov. 5, 1996

[54] DEVICE FOR SHEATHING A FILIFORM MATERIAL WITH A MOLTEN SUBSTANCE

[75] Inventors: Philippe Boissonnat, Barby; Dominique Loubinoux, La Terrasse; Louis Roy, Chambery, all of France

[73] Assignee: Vetrotex France S.A., Chambery, France

[21] Appl. No.: 129,104

[22] PCT Filed: Feb. 5, 1993

[86] PCT No.: PCT/FR93/00124

§ 371 Date: Nov. 30, 1993

§ 102(e) Date: Nov. 30, 1993

[87] PCT Pub. No.: WO93/15896

PCT Pub. Date: Aug. 19, 1993

[30] Foreign Application Priority Data

Feb. 6, 1992 [FR] France ................................. 92 01328

[51] Int. Cl.⁶ ........................................................ B05C 3/02
[52] U.S. Cl. .................................. 118/405; 118/DIG. 18; 425/113; 425/133.1; 425/188
[58] Field of Search .................................. 425/113, 133.1, 425/188; 164/423, 462, 267–268; 118/405, DIG. 18, 419; 427/434.4

[56] References Cited

U.S. PATENT DOCUMENTS

| | | |
|---|---|---|
| 2,198,085 | 4/1940 | Le Tourneau et al. |
| 3,467,739 | 9/1969 | Underwood et al. |
| 3,676,095 | 7/1972 | Stalego |
| 3,694,131 | 9/1972 | Stuart |
| 4,194,462 | 3/1980 | Knowles ................................. 118/405 |
| 4,406,196 | 9/1983 | Roncato et al. |
| 4,614,678 | 9/1986 | Ganga |
| 4,623,495 | 11/1986 | Degoix et al. |
| 4,688,515 | 8/1987 | Rosebrooks ....................... 118/DIG. 18 |
| 4,713,139 | 12/1987 | Ganga |
| 5,011,523 | 4/1991 | Roncato et al. |

FOREIGN PATENT DOCUMENTS

| | | |
|---|---|---|
| 0 033 244 | 8/1981 | European Pat. Off. |
| 0 218 952 | 4/1987 | European Pat. Off. |
| 0 393 536 | 10/1990 | European Pat. Off. |
| 0 456 970 | 11/1991 | European Pat. Off. |
| 1 024 205 | 3/1953 | France |
| 1 139 970 | 11/1962 | Germany |
| 1 604 338 | 12/1981 | United Kingdom |

OTHER PUBLICATIONS

Chang, Yung Yen; Applied Plastic Molding Tools; *Second Edition*, 1980; p. 32.
Patent Abstracts Of Japan, vol. 5, No. 131 (M-84)(803), 21 Aug. 1981 & JP, A, 56 67 239 (Furukawa Denki Kogyo), 6 Jun. 1981, see abstract.
Patent Abstracts Of Japan, vol. 5, No. 174 (M-96)(846), 10 Nov. 1981 & JP, A, 56 101 839 (Furukawa Denki Kogyo), 14 Aug. 1981, see abstract.
Patent Abstracts Of Japan, vol. 6, No. 36 (M-115)(914), 5 Mar. 1982 & JP, A, 56 150 527 (Furukawa Denki Kogyo), 21 Nov. 1981, see abstract.

*Primary Examiner*—Brenda A. Lamb
*Attorney, Agent, or Firm*—Pennie & Edmonds

[57] ABSTRACT

The present invention relates to a device for coating a thread with a thermoplastic organic material. This device, which is mounted in the manner of a cross head at the end of an extruder, comprises an inlet aperture followed by a hollow punch, of which the conduit opens into a central duct, the said duct being connected to the extruder by way of a supply chamber, part of this device being movable or removable, and displacement of the said part enabling the said device to be opened and closed along its entire height, from its periphery to its axis. Application to the production of composite products.

4 Claims, 2 Drawing Sheets

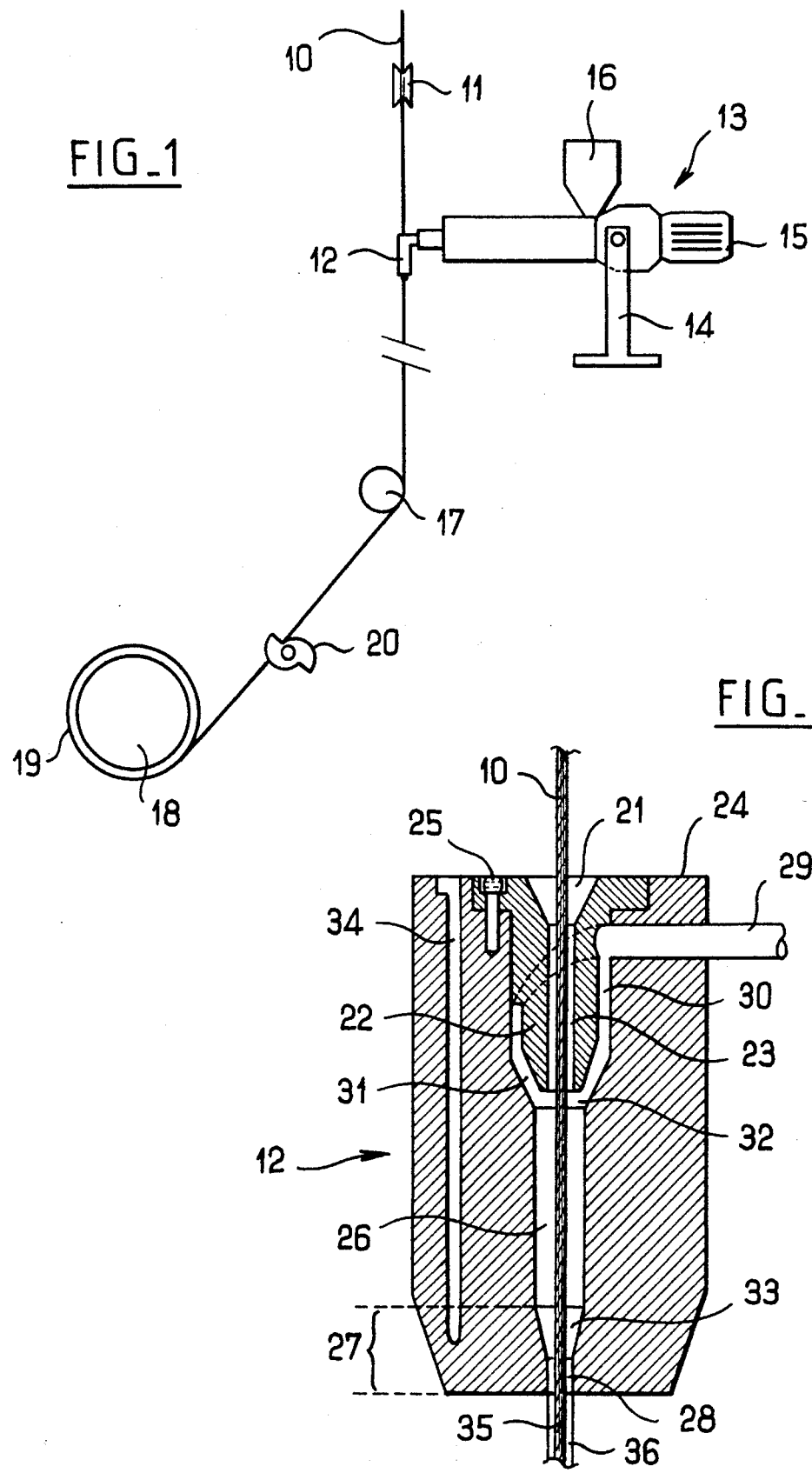

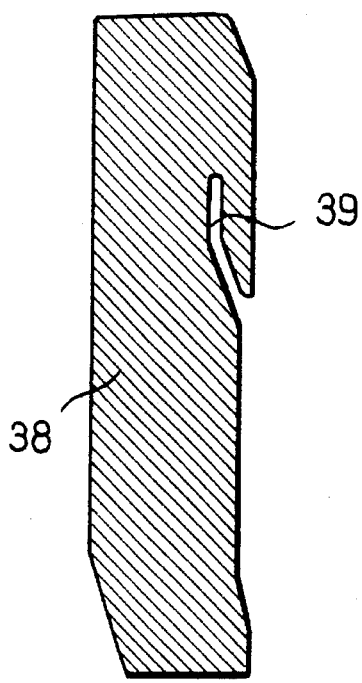
FIG_3B
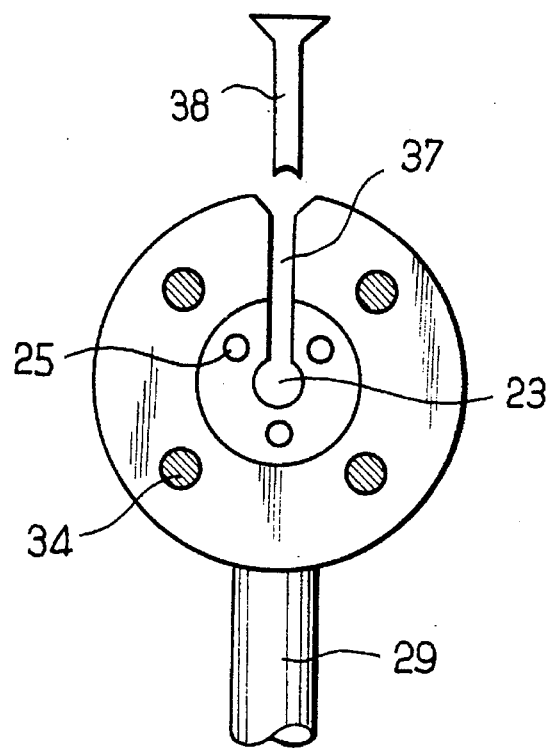
FIG_3A
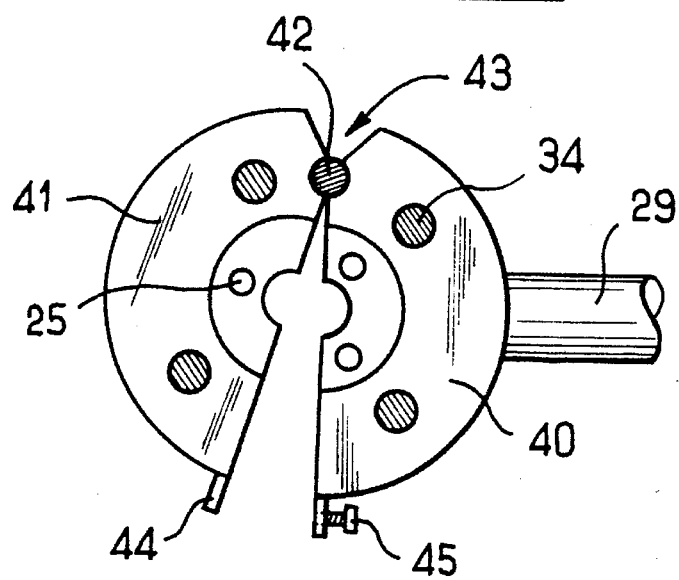
FIG_4

5,571,326

DEVICE FOR SHEATHING A FILIFORM MATERIAL WITH A MOLTEN SUBSTANCE

The present invention relates to a device for coating a filiform material, consisting of an assembly of threads and/or filaments, with a molten organic material.

There already exist a given number of devices known as cabling heads, coating heads or cross heads, which are mounted on the end of an extruder and enable a layer of thermoplastic organic material to be deposited on the surface of a filiform material.

A device of this type is described for example in U.S. Pat. No. 4,713,139. This device substantially comprises a conduit for guiding the material and, at its outlet, an annular aperture through which the organic material is supplied, and which is disposed concentrically to the outlet aperture of the said material.

At its outlet, the organic material is drawn in the form of a cone by the moving material and is applied to the surface of the latter a few millimeters after the outlet.

The principle of this device is to restrict the velocity of advance of the material which, in the above-described example, does not exceed 1 to 2 meters per second. If this velocity is exceeded, there is a risk that the material will no longer be regularly coated, since the organic material is then drawn too violently to enable breakage to be avoided.

EP-A-393 536 describes another type of device, which enables the filiform material to be brought into contact with the organic material inside the device itself. The latter substantially comprises a device for guiding the material at the inlet and outlet, and between the two an impregnation chamber connected directly to the extruder. The material, which in this case consists of a thread formed from a plurality of filaments, is brought into contact with the material under pressure, which can thus impregnate it thoroughly. The organic material is injected into the central chamber at right angles to the trajectory of the thread, which causes it to break up and separates a given number of threads from those adjacent them. The pressure, which is preferably exerted from a single side of the thread, also gives rise to irregular distribution of the filaments within the organic material. This effect is incidentally required.

The principle of this device thus does not itself permit a composite material to be obtained, within which the filiform material has retained its cohesion.

Additionally, in known devices the filiform material is introduced by means of an aperture provided along their longitudinal axis. This method of introduction can cause problems when the material consists of very fine filaments and when it is important to restart the coating process very quickly after a breakage of the said material has occurred.

The object of the present invention is a device which enables a filiform material to be coated, and optionally to be impregnated with a layer of thermoplastic organic material, at a velocity greater than that obtained by means of known devices, and into which the said material can be introduced quickly.

The object of the present invention is also a device which enables a composite material to be obtained, which consists of an assembly of coated threads and/or filaments and is optionally impregnated with an organic material, and within which a regular distribution of the threads and/or filaments is maintained.

The object of the present invention is a device which in particular permits a composite thread to be obtained, of which the core, consisting of a bundle of filaments, is coated with a thermoplastic organic material.

The objects of the invention are achieved by means of a device which is mounted in the manner of a cross head on the end of an extruder and along its axis comprises an inlet aperture followed by a hollow punch, of which the conduit opens into a central duct, the said duct being connected to the extruder by means of a supply chamber, then at the outlet of the duct a die plate, one part at least of this device being movable or removable, and displacement of the said part enabling the said device to be opened and closed along its entire height, from its periphery to its axis.

The device according to the invention can comprise a longitudinal slot along the entire height of the said device, extending from its periphery to its axis. In this case the movable part is a stopper part which fills the slot, and of which the profile enables the walls of the various conduits to be reconstituted inside the device.

The device according to the invention can consist of two parts which are symmetrical relative to a plane which passes through its axis. The fixed part is connected to the extruder; the movable part pivots about a longitudinal hinge which is integral with the two parts. In the position in which they are closed, the two parts abut one another and form the walls of the various conduits within the device.

Thus when a breakage has occurred, the filiform materials can once more be mechanically driven before being introduced laterally into the axis of the device. The latter can be closed and the injection recommence quickly.

The inner structure of the coating device is also important in that it must permit regular coating of the filiform material, even if the latter advances at high velocities, in view of the fact that the organic material cannot be injected at high pressures.

Thus the filiform material, for example a thread consisting of a plurality of glass filaments previously guided by the conduit of the punch, enters the central duct along the axis of the latter, in which area it is in contact with the molten, pressurised thermoplastic organic material. The cross-section of the duct is regular along at least part of the length of the latter, and is larger than that of the said conduit. The organic material is supplied via one or a plurality of the apertures which face the axis of the duct and are disposed concentrically relatively to the said axis, and exerts on the surface of the thread a regular radial pressure directed towards the centre of the said thread. The thread, which is thus subjected to a field of balanced pressures as it passes through the duct, does not tend to break.

Additionally, with a central channel, the cross-section of which is constant along at least part of its length, the thread is subjected to a constant radial pressure as it travels along at least part of the duct. This assists the quality of impregnation of the thread.

In order for this radial pressure to be exerted as regularly as possible on the thread when it comes into contact with the molten material, the apertures or apertures of the supply chamber preferably lead to the inlet of the central duct.

The molten material preferably reaches the duct via a single aperture which opens over the entire periphery of the duct, for example in the form of an aperture which is annular if the duct is cylindrical.

This concentric supply enables the cohesion of the filaments which constitute the thread to be maintained, and the regulation of the pressure and/or viscosity of the material which comes into contact with it, and of its speed of passage through the device, also enables it to be impregnated at least partially with organic material.

The device according to the invention thus enables a thread to be obtained, of which the central part consists of a bundle of filaments which are not impregnated with organic material and is surrounded on its periphery by an impregnated area, the unit as a whole being coated with a layer of predetermined thickness.

According to a preferred embodiment of the invention, the supply chamber surrounds the hollow punch and has at the bottom a frusto-conical conduit which converges towards the axis of the central duct.

This conduit, which leads into the duct via an annular aperture, enables molten material to be injected into the said channel in a direction close to that of the advancing thread. The difference which may exist between the velocity of the thread and the average velocity of the flow of molten material can thus be reduced considerably. Owing to this inner structure the velocity of the material is at least 0.5 times the velocity of the thread. This enables the pressure at which the material is injected into the duct to be reduced. This pressure is lower than 50 bars, and preferably lower than 30 bars. This also enables the shear to which the organic material is subjected when it comes into contact with a thread advancing at high speed to be reduced considerably.

By means of this feature, the device enables a thread which is passing through it at a velocity greater than 5 meters per second to be coated and optionally impregnated, without adversely affecting the quality of the coating.

By using thread extracted from rolls, this advantage enables the length of thread covered per unit of time to be increased considerably. In particular this advantage enables the device according to the invention to be integrated in the production installation of the thread to be covered.

The device according to the invention can for example be installed in a glass fibre production installation. An installation of this type substantially comprises a die plate, in general made of a metal alloy and heated by the Joule effect, which is used in order to remelt the glass or to maintain it in the molten state. The glass flows from the die plate via a plurality of apertures, in the form of thin streams which, when mechanically drawn, give rise to an assembly of continuous filaments. These filaments are joined together to form a thread which is drawn directly through the device according to the invention, before being wound onto a rotary support for example. Accidental breakage of a plurality of filaments stops production. The assembly of filaments must then be reformed and combined into a thread which is mechanically drawn. Immediately after this operation, the wire being drawn is introduced into the device according to the invention. The coating operation can then recommence with a minimum loss of time.

It can also be installed in a mixed glass fibre-organic material production installation, as described for example in EP-A-367 661.

In addition to the aforementioned production increase, the use of the device according to the invention in a direct method eliminates the production, packaging and storage of rolls of thread, the time-consuming steps which usually precede the coating operation.

The invention will be better understood by means of the following detailed description of some embodiments, illustrated by the Figures, in which:

FIG. 1 is a schematic lateral partial view of the installation in which the device according to the invention is used;

FIG. 2 is a schematic longitudinal cross-section of a device according to the invention, in use;

FIG. 3A is a schematic view corresponding to a projection on a transverse plane of a first embodiment of the invention;

FIG. 3B is a schematic longitudinal cross-section of part of the device shown in FIG. 3A; and FIG. 4 is a schematic view corresponding to a projection on a transverse plane of a second embodiment of the invention.

According to FIG. 1 a mixed thread 10 consisting of an assembly of glass and polypropylene filaments, is guided by a mechanism 11, the function of which is to maintain the thread 10 in the axis of the device 12, which is mounted in the manner of a cross head and vertically at the end of the extruder 13. This extruder, which is integral with the support 14, is provided with two lifting screws which are rotated by the motor 15.

The extruder 13 is supplied with thermoplastic organic material in the form of granules stored in the hopper 16. This extruder enables the molten organic material to be injected into the device 12, under high pressure which however remains less than 50 bars.

The thread 10, coated with a layer of organic material which on the surface at least is solidified, moves onto a guide unit 17 before being wound onto a spindle 18, which is rotated by a motor. The thread 10 is wound in the form of a roll 19 by means of a distribution unit 20.

Instead of being drawn by a rotating spindle, the thread 10 can be drawn by a fibre-drawing wheel and distributed on a conveyor, in accordance with the methods and devices described for example in U.S. Pat. No. 3,467,739 and U.S. Pat. No. 3,676,095.

The thread 10 can also be drawn by a cutting machine, as disclosed for example in U.S. Pat. No. 4 406, 196. In the latter case, the thread is preferably a thread to which torsion has been applied before it is covered, which structure prevents it from being crushed between the wheels of the cutting machine as a conventional thread would be.

FIG. 2 shows a longitudinal cross-section of the inner structure of an embodiment of the device 12.

At the top this device comprises an aperture 21 provided in the top of a hollow die or punch 22, the basic function of the central conduit 23 of which is to guide the thread 10 and to centre it perfectly in the axis of the device. This punch is itself attached to the body 24 of the device 12 by means of nuts 25.

The conduit 23 leads to the top of a cylindrical central duct 26, of which the straight cross-section is larger than that of the said conduit. The duct 26 leads to an area 27 with a smaller cross-section, of which the outlet aperture 28 acts as a die plate.

The device 12 is connected to the extruder by means of the supply conduit 29. This conduit leads inside the device 12 into a feed chamber 30 which surrounds the punch 22. At the bottom this chamber has a frusto-conical conduit 31, which leads in the form of an annular opening 32 to the top of the duct 26.

This structure simultaneously permits the thread 10 to be subjected to regular radial pressure as soon as it comes into contact with the molten material, and to force the latter to flow so as to accompany the thread as it moves.

The area 27 consisting of a frusto-conical passage 33 and the aperture 28, enables the organic material to be maintained under pressure in the duct 26.

Heating resistors 34, of which the connection is not shown, can be accommodated in the body 24 in order to maintain the organic material at the required temperature.

At the outlet of the device 12, the resultant thread comprises a core 35, consisting of the bundle of filaments which constitutes the thread 10 coated with a calibrated layer 36 of organic material.

FIG. 3A shows in transverse cross-section an embodiment of the device according to the invention, of which the inner structure is shown in FIG. 2. This device comprises a longitudinal slot 37 along the entire height of the device, opposite the supply conduit 29 which connects it to the extruder. This slot, which penetrates as far as the conduit 23 of the punch and to the central duct 26 and extends in the area 27, enables the thread 10 to be introduced quickly during a restarting operation. This is particularly advantageous when the device according to the invention is installed in a thread production installation, for example when glass fibre is involved.

As soon as the restarting has been completed, a stopper part 38 fills the slot in order to reconstitute the walls of the conduit 23, of the duct 26 and of the area 27. This part 38 is maintained in position by a closing device.

FIG. 3B shows the part 38 in longitudinal cross-section. The part comprises a notch 39 which enables the chamber 30 and the conduit 31 to be reconstituted.

FIG. 4 shows a variant of the device 12. This variant comprises a fixed part 40 connected to the extruder by means of the supply conduit 29, and a part 41 which is movable about a longitudinal hinge 42 integral with the two parts. In the closed position these two symmetrical parts match one another in a longitudinal plane which passes through the axis of the device 12. Their inner surfaces are machined such that when they are closed, they reconstitute the conduit of the punch 22, the supply chamber 30, the duct 26 and the aperture 28, as shown in FIG. 2. The hinge 42 can be attached to a generatrix of the device, or to the base of a notch 43 provided along its entire height. A device such as a lug 44 associated with a screw 45 enables the two parts to be locked in the closing position.

EXAMPLE

A device according to the invention is disposed in the manner of a cross head at the end of a single screw extruder (screw diameter=25 mm; L/D=30). This device, of the type shown in FIG. 2, has the following features:

diameter of punch passage (23)=0.95 mm diameter of central duct (24)=2 mm length of central duct (24)=40 mm.

This device is supplied with molten material formed from the following mixture:

30% of hydrogenated hydrocarbon resin:
  ball/ring softening point=97°–103° C.
  Brookfield viscosity=150 mPa.s at 180° C.

50% of polypropylene wax:
  ball/ring softening point=163° C.
  Brookfield viscosity=600 mPa.s at 190° C.

20% of polypropylene modified chemically by grafting of maleic anhydride:
  ball/ring softening point=157° C.
  Brookfield viscosity=275 mPa.s at 190° C.

The temperature of the device is approximately 230° C. The pressure of the material inside the device is approximately 10 to 15 bars.

A mixed thread, consisting of organic filaments and glass filaments, passes through the device at a velocity of 10 meters per second.

This thread consists of 800 filaments of glass E of an average diameter of 14 microns and 750 filaments obtained by extrusion of a polypropylene homopolymer mixture, of which the fluidity index is 20 dg/min (measured in accordance with standard ISO 1133) and a polypropylene modified chemically by maleic anhydride grafting. The glass filaments are sized with a size in the non-aqueous phase. This size essentially comprises an epoxy cyclo aliphatic resin, a vinyl ether and an amine silane.

In these conditions a thread is obtained which comprises a core consisting of the bundle of filaments, of which the external area is impregnated with organic material, the entire assembly being coated with a layer of the said material.

The amount of the organic material which impregnates and covers the mixed thread, expressed as a weight percentage relative to the titre of the thread, is 20%.

The device according to the invention can be used in order to cover either threads consisting of filaments for reinforcement purposes, such as glass, carbon, aramide or metal filaments, or mixed threads.

The threads covered by the device according to the invention may or need not involve torsion.

We claim:

1. In an apparatus for coating of an elongated material consisting of a group of threads or filaments with an organic material in the molten state, said apparatus including an extruder having an output end and a crosshead device mounted on said output end, said device having an inlet end and an outlet end, an outer periphery and a central longitudinal axis along which said elongated material is fed for coating with said organic material from said extruder, the improvement in said device comprising:

a) an internal central duct disposed along said longitudinal axis of said device adjacent said outlet end, said duct having a duct inlet and a duct outlet, said duct outlet defining said outlet end of said device;

b) an internal feed chamber disposed above said duct for feeding said organic material from said extruder to said duct; said feed chamber having a chamber outlet opening disposed concentrically with respect to said longitudinal axis and communicating with said duct inlet;

c) a hollow die disposed internally of said device at the inlet end thereof, said hollow die having an internal central conduit extending along said longitudinal axis with a conduit outlet communicating with said duct inlet;

d) a side opening extending from said inlet end to said outlet end of said device and from said longitudinal axis to said outer periphery of said device for permitting relative lateral movement of said elongated material and said device between a first position with said elongated material disposed laterally outwardly of the periphery of said device and a second position with said elongated material disposed along said longitudinal axis, said side opening being defined by a slot extending through said device; and e) closing means for closing said side opening to provide said duct, said feed chamber and said central conduit, said closing means including a removable separate stopper part positioned within said slot for completely blocking said slot.

2. In an apparatus for coating of an elongated material consisting of a group of threads or filaments with an organic material in the molten state, said apparatus including an extruder having an output end and a crosshead device mounted on said output end, said device having an inlet end and an outlet end, an outer periphery and a central longitudinal axis along which said elongated material is fed for coating with said organic material from said extruder, the improvement in said device comprising:

a) an internal central duct disposed along said longitudinal axis of said device adjacent said outlet end, said duct having a duct inlet and a duct outlet, said duct outlet defining said outlet end of said device;

b) an internal feed chamber disposed above said duct for feeding said organic material from said extruder to said duct; said feed chamber having a chamber outlet opening disposed concentrically with respect to said longitudinal axis and communicating with said duct inlet;

c) a hollow die disposed internally of said device at the inlet end thereof, said hollow die having an internal central conduit extending along said longitudinal axis with a conduit outlet communicating with said duct inlet;

d) a side opening extending from said inlet end to said outlet end of said device and from said longitudinal axis to said outer periphery of said device for permitting relative lateral movement of said elongated material and said device between a first position with the elongated material disposed laterally outwardly of the periphery of said device and a second position with the elongated material disposed along said central longitudinal axis;

e) said device being constructed of first and second parts separated along a plane extending along said longitudinal axis, with said first part being connected to said extruder; and f) closing means for closing said side opening to provide said duct, said feed chamber and said central conduit, said closing means comprising a hinge disposed along the periphery of said device and extending in a direction parallel to said longitudinal axis, said hinge connecting said first and second parts together for pivoting movement of said second part between an open position spaced from said first part to define said side opening and a closed position engaging said first part along said plane to define said duct, said feed chamber and said central conduit.

3. The coating apparatus according to either one of claims 1-2 wherein:

a) said duct is cylindrical in shape; and b) said chamber outlet opening communicating with said duct inlet is annular in shape.

4. The coating apparatus according to claim 2 wherein:

a) said feed chamber surrounds said hollow die; and b) said chamber outlet opening has an annular frusto-conical shape.

* * * * *